(12) United States Patent
Weigel

(10) Patent No.: US 11,242,102 B2
(45) Date of Patent: Feb. 8, 2022

(54) DRIVING DEVICE FOR AN ELECTRIC BICYCLE WITH ELECTRONIC ANTI-THEFT DEVICE AND METHOD OF CONTROL

(71) Applicant: Brose Antriebstechnik GmbH & Co. Kommanditgesellschaft, Berlin, Berlin (DE)

(72) Inventor: Christfried Weigel, Berlin (DE)

(73) Assignee: Brose Antriebstechnik GmbH & Co. Kommanditgesellschaft, Berlin, Berlin (DE)

( * ) Notice: Subject to any disclaimer, the term of this patent is extended or adjusted under 35 U.S.C. 154(b) by 313 days.

(21) Appl. No.: 16/576,889

(22) Filed: Sep. 20, 2019

(65) Prior Publication Data
US 2020/0108882 A1 Apr. 9, 2020

(30) Foreign Application Priority Data
Sep. 25, 2018 (DE) ...................... 10 2018 216 340.5

(51) Int. Cl.
*B62H 5/10* (2006.01)
*B60L 50/20* (2019.01)
(Continued)

(52) U.S. Cl.
CPC ................ *B62H 5/10* (2013.01); *B60L 50/20* (2019.02); *B62H 5/14* (2013.01); *B62M 6/55* (2013.01);
(Continued)

(58) Field of Classification Search
CPC ... B62H 5/10; B62H 5/18; B62H 5/20; B62H 5/14; B60L 50/20; B60L 2200/12;
(Continued)

(56) References Cited

U.S. PATENT DOCUMENTS 2,500,593 A * 3/1950 Wilson ................ B60R 25/0222
70/252
4,402,503 A * 9/1983 Galbierz ............ A63B 22/0605
188/31
(Continued)

FOREIGN PATENT DOCUMENTS

CN 103832512 A 6/2014
CN 103909998 A 7/2014
(Continued)

*Primary Examiner* — Kevin Hurley
*Assistant Examiner* — Marlon A Arce
(74) *Attorney, Agent, or Firm* — Brooks Kushman P.C.

(57) ABSTRACT

A driving device for an electric vehicle includes a pedal shaft, first and second electric motors, an output shaft, and a superposition transmission whose gear ratio is steplessly adjustable by way of the electric motors. The transmission also couples the pedal shaft and the output shaft to each other. A torque generated by the first electric motor and/or the second electric motor can be at least partially transmitted to the output shaft. The driving device further includes an electronic anti-theft device used to lock the bicycle. When locked, at least one of the electric motors is operable to generate a torque that counteracts a rotation of the pedal shaft in a forward direction of rotation to inhibit theft of the bicycle.

20 Claims, 3 Drawing Sheets

(51) Int. Cl.
  *B62H 5/14* (2006.01)
  *B62M 6/55* (2010.01)
  *B62M 9/04* (2006.01)
  *B62M 11/14* (2006.01)
(52) U.S. Cl.
  CPC .............. *B62M 9/04* (2013.01); *B62M 11/14* (2013.01); *B60L 2200/12* (2013.01)
(58) Field of Classification Search
  CPC ............... B60L 2270/36; F16H 37/084; F16H 2037/0866; F16H 3/724; B62M 6/45; B62M 6/55; B62M 9/04; B62M 11/14; B62M 11/145
  See application file for complete search history.

(56) References Cited

U.S. PATENT DOCUMENTS

| | | | | |
|---|---|---|---|---|
| 2012/0012412 | A1* | 1/2012 | Moeller | B62M 6/65 180/206.2 |
| 2012/0146429 | A1 | 6/2012 | Seol | |
| 2018/0197401 | A1* | 7/2018 | Khaligh | B62M 6/55 |
| 2020/0023917 | A1* | 1/2020 | Hu | B62H 5/003 |
| 2020/0389765 | A1* | 12/2020 | Bridges | B62J 3/00 |
| 2021/0125499 | A1* | 4/2021 | Cooper | G06Q 30/0627 |
| 2021/0148463 | A1* | 5/2021 | Wetzel | F16H 61/0003 |

FOREIGN PATENT DOCUMENTS

| | | |
|---|---|---|
| DE | 19532067 C1 | 10/1996 |
| DE | 20316619 U1 | 3/2004 |
| DE | 69818130 T2 | 6/2004 |
| DE | 202004011084 U1 | 10/2004 |
| DE | 102004054331 A1 | 6/2005 |
| DE | 202006005467 U1 | 8/2006 |
| DE | 69735876 T2 | 12/2006 |
| DE | 202008000971 U1 | 3/2008 |
| DE | 102008015195 A1 | 10/2009 |
| DE | 102008020950 A1 | 10/2009 |
| DE | 102008020951 A1 | 10/2009 |
| DE | 102008032094 A1 | 1/2010 |
| DE | 102009001374 A1 | 9/2010 |
| DE | 102009033475 A1 | 1/2011 |
| DE | 102009028211 A1 | 2/2011 |
| DE | 102011004464 A1 | 8/2012 |
| DE | 102011006444 A1 | 10/2012 |
| DE | 102012217775 A1 | 4/2014 |
| DE | 102014109000 A1 | 12/2015 |
| DE | 102014211767 A1 | 12/2015 |
| DE | 102015200178 A1 | 7/2016 |
| DE | 102015224774 A1 | 6/2017 |
| DE | 102018001795 A1 | 9/2019 |
| EP | 1730020 A1 | 12/2006 |
| EP | 1910634 A2 | 4/2008 |
| EP | 1818246 B1 | 11/2011 |
| EP | 2218634 B1 | 1/2012 |
| FR | 3003537 A1 | 9/2014 |
| WO | 2010003863 A1 | 1/2010 |
| WO | 2011003407 A1 | 1/2011 |
| WO | 2015193009 A1 | 12/2015 |

* cited by examiner

DRIVING DEVICE FOR AN ELECTRIC BICYCLE WITH ELECTRONIC ANTI-THEFT DEVICE AND METHOD OF CONTROL

CROSS-REFERENCE TO RELATED APPLICATIONS

This application claims priority to German patent application Serial No. DE 10 2018 216 340.5 filed Sep. 25, 2018, the disclosure of which is hereby incorporated in its entirety by reference herein.

TECHNICAL FIELD

The proposed solution in particular relates to a driving device for an electric bicycle.

BACKGROUND

It is known to employ two electric motors in combination with a superposition transmission on an electric bicycle, hence on a so-called E-Bike or Pedelec, in order to steplessly adjust a gear ratio between input and output. Such a driving device on the one hand includes a pedal shaft via which a driving torque generated by a rider of the electric bicycle can be introduced and on which pedals are provided therefor. Via an output shaft of the driving device to be coupled with a wheel of the electric bicycle a driving torque introduced on the pedal shaft and/or an electromotively generated torque then is transmitted to a wheel, usually a rear wheel of the electric bicycle. Via the superposition transmission the pedal shaft and the output shaft are coupled with each other, wherein a torque generated by a first electric motor of the two electric motors can at least partly be transmitted to the output shaft. Via the second electric motor of the two electric motors a gear ratio is steplessly adjustable so that the electric bicycle can be accelerated via a driving torque of the first electric motor without the pedal shaft having to be rotated more quickly or with greater force. Thus, the second electric motor also serves to support the torque generated by the first electric motor and therefor can rotate a rotor shaft in different directions of rotation depending on the gear ratio. A driving device for an electric bicycle with a comparable superposition transmission and two electric motors is known for example from EP 2 218 634 B1.

From DE 10 2011 006 444 A1 an anti-theft device furthermore is known, which can be used in particular in electric bicycles and which is focused on the fact that individual components of the electric bicycle are provided with an individualizing identifier which at the same time is associated with exactly that one electric bicycle in order to make an abusive removal of these components and in particular the disassembly of the electric bicycle into its individual parts unattractive for a thief. In DE 10 2011 006 444 A1 it has also been thought about blocking functions of the individual (electronic) components, unless the identifiers of the components used do not match.

In practice, however, there still exists the problem that especially high-priced electric bicycles regularly can be protected from being stolen only by means of expensive mechanical locks. Even comparatively heavy and complex locks often cannot prevent the electric bicycle from being stolen. After the lock being broken open, the electric bicycle then can usually also be used without restriction.

Therefore, it is the object underlying the proposed solution to provide an anti-theft protection for an electric bicycle improved in this respect, in particular for an electric bicycle with a drive which comprises a superposition transmission with two electric motors.

SUMMARY

Accordingly, there is proposed a driving device for an electric bicycle pedal shaft that includes an output shaft coupled with a wheel of the electric bicycle for driving the wheel of the electric bicycle, and a superposition transmission. Via the superposition transmission, the pedal shaft and the output shaft are coupled with each other (in a torque-transmitting manner), wherein the gear ratio of the superposition transmission is steplessly adjustable by means of two electric motors of which a first electric motor generates a torque which can at least partly be transmitted to the output shaft in order to thereby accelerate the electric bicycle. The proposed driving device furthermore comprises an electronic anti-theft device via which at least one of the electric motors is operable in an operating condition in which an electromotively generated torque counteracts a rotation of the pedal shaft in a forward direction of rotation.

The forward direction of rotation corresponds to the direction of rotation of the pedal shaft in order to convert a driving force applied by a rider of the electric bicycle into a forward movement of the electric bicycle via the pedal shaft. When an electronic anti-theft device is not present or not activated, such a rotation of the pedal shaft hence would lead to a possibly electromotively amplified output torque on the output shaft so that a power transmission member coupled with the output shaft and driven by the output shaft, such as for example a chain or a belt, in particular a toothed belt, puts a coupling part non-rotatably connected with the wheel to be driven, such as for example a sprocket or a toothed pulley, into rotation. Via the electronic anti-theft device a counteracting electromotively generated torque is produced against such driving torque on the pedal shaft so that no (more) torque is available on the output shaft or at best such a small output torque that the electric bicycle can thereby be driven only with a specified speed below 3 km/h, in particular below 2 km/h or even only below 1 km/h. When the electronic anti-theft device is activated, the electric bicycle thus cannot be accelerated by a thief or hence cannot be used or sold easily by the same.

In this connection, the driving device for example can comprise an electronic control unit which is configured to actuate at least one of the electric motors for generating the counteracting torque in response to an electronically detected rotation of the pedal shaft in the forward direction of rotation, when the anti-theft device is activated. Hence, when the anti-theft device is activated, the rotation of the pedal shaft directly or at least after a specified time leads to the generation of a counteracting torque in the drive of the electric bicycle so that the electric bicycle cannot be used properly. The driving device and the drive of the electric bicycle provided therewith thus are braced against themselves via the electronic anti-theft device when the pedal shaft (with activated anti-theft device) is rotated in the forward direction of rotation.

The electronic control unit in particular can be configured to actuate the at least one electric motor for generating the counteracting torque, when the anti-theft device is activated, only after it has been electronically detected that a rotational speed of the pedal shaft has exceeded a threshold value, the pedal shaft has been rotated by at least a stored minimum number of revolutions or (since a detected rotation of the pedal shaft initially at rest) a defined monitoring period has elapsed. Thus, in the constellations outlined above a counteracting torque each is electromotively generated only when at least one further criterion is fulfilled, when the anti-theft device is activated. For example, the generation of the counteracting torque can depend on the fact that the pedal shaft is rotated at a certain speed or frequency and/or already rotated for a stored monitoring period, without the anti-theft device having been deactivated.

The fact that a counteracting torque only is generated electromotively when a rotational speed of the pedal shaft exceeds a threshold value for example can provide for a configuration in which the electric bicycle comprising a design variant of the proposed driving device can still be used in an emergency mode even when the anti-theft device is activated. In this emergency mode, the electric bicycle for example can still be ridden into a specialist workshop in a case of repair or a possible malfunction, but then only at a distinctly reduced speed, as from a certain rotational speed of the pedal shaft the anti-theft device each blocks a greater acceleration of the electric bicycle.

Alternatively or in addition, it can be provided that the anti-theft device is equipped and configured to electronically identify an authorized user and can be deactivated in response to the authentication of an authorized user. In such a design variant, the anti-theft device hence cannot or not only be mechanically activated and/or deactivated. Rather, an electronic authentication is provided in order to permit a use of the electric bicycle only for an authorized user.

An authorized user can electronically identify himself to the anti-theft device by entering a code (e.g., a password or a PIN) and/or via biometrical characteristics (e.g., a fingerprint, facial recognition, and/or the like). For this purpose, the anti-theft device of the driving device for example can include an operating part provided on the electric bicycle, which a user can use to authenticate himself to the anti-theft device. Alternatively or in addition, the anti-theft device can be equipped or be coupled with a biometrical authentication system, in particular be wirelessly coupled therewith, in order to provide for a biometrical authentication of an authorized user for deactivating the anti-theft device.

In one example embodiment, the anti-theft device comprises a mobile transmitting device or the anti-theft device can be coupled with a mobile transmitting device, for example in the form of a mobile device, in particular in the form of a smartphone. On a mobile transmitting device, an authorized user can authenticate himself, wherein the mobile transmitting device then for example is configured to wirelessly send a deactivation signal to the anti-theft device when an authorized user could be authenticated successfully. In such a design variant, the anti-theft device hence for example comprises a receiver for wirelessly receiving a deactivation signal from the mobile transmitting device when an authorized user could successfully be authenticated thereby.

In some embodiments, the anti-theft device may include a transmitter for transmitting a status signal to a (remote) mobile transmitting device or to another receiver, for example associated with an authorized user, in order to wirelessly inform about the activation and/or deactivation of the anti-theft device. The anti-theft device of the driving device thus for example can be configured to send a status signal to a smartphone of an authorized user in order to thereby signal that the anti-theft device has been activated successfully and/or deactivated successfully. In this way, an authorized user directly receives an information that his electric bicycle has been unlocked by a deactivation of the anti-theft device. When the authorized user is not on his electric bicycle at the time of the receipt of a corresponding message, this for example suggests that an attempted theft is made at his time.

A transmitter of the anti-theft device furthermore can serve to send out a location signal to the current location of the electric bicycle, in particular to a mobile transmitting device of the authorized user or to a central server in order to each inform about the current location of the electric bicycle. For example, such a location signal then contains GPS data.

In one design variant it can also be provided for example that the electronic control unit is configured to actuate the at least one electric motor for generating the counteracting torque, when the anti-theft device is activated, only after an authorized user has not been authenticated within a specified period after the electronic detection of a movement of the electric bicycle. For this purpose, the anti-theft device for example is equipped with a timing element or timer which after an electronic detection of a movement of the electric bicycle is started automatically. The electronic detection of a movement of the electric bicycle is effected for example via a sensory detection of a rotation of at least one wheel of the electric bicycle and/or via a sensory monitoring of a rotating component of the driving device, for example a gear wheel or a shaft of the driving device. When after an electronic detection of a movement of the electric bicycle with an activated anti-theft device no authentication of an authorized user is effected within a specified period, for example less than 10 or 5 seconds, at least one of the electric motors of the driving device is actuated for generating the counteracting torque and hence the drive of the electric bicycle is switched to be unusable.

The electronic control unit may be configured to actuate the at least one electric motor for generating the counteracting torque, when the anti-theft device is activated, only after it has been electronically detected that on the one hand a rotational speed of the pedal shaft has exceeded a threshold value, the pedal shaft has been rotated by at least a stored minimum number of revolutions or (since a detected rotation of the pedal shaft initially at rest) a defined monitoring period has elapsed, and on the other hand no authorized user has been authenticated within a specified period after an electronic detection of a movement of the electric bicycle. The generation of a counteracting torque via the activated anti-theft device here consequently depends on the existence of several (at least two) criteria. This can possibly serve to increase an operating comfort for an authorized user of the electric bicycle.

The proposed solution furthermore also relates to a method for controlling a drive of an electric bicycle.

In the drive to be controlled, a pedal shaft and an output shaft coupled with a wheel of the electric bicycle are coupled to each other via a superposition transmission. A gear ratio of the superposition transmission is steplessly adjustable by means of two electric motors of the drive and a torque generated by a first electric motor of the two electric motors can at least partly be transmitted to the output shaft. In connection with the proposed control method, it is furthermore provided that via an electronic anti-theft device at least one of the electric motors is operated in an operating condition in which an electromotively generated torque counteracts a rotation of the pedal shaft in a forward direction of rotation, when the electronic anti-theft device is activated.

Such a method can of course also be implemented via a computer program product. Such a computer program product then for example contains instructions which, when they are executed by at least one processor of a control unit of a driving device of an electric bicycle, cause the at least one processor to execute a corresponding control method.

A proposed method in principle can also be implemented via a design variant of a proposed driving device. The advantages and features explained above and below for design variants of a proposed driving device correspondingly also apply for design variants of a proposed control method, and vice versa.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
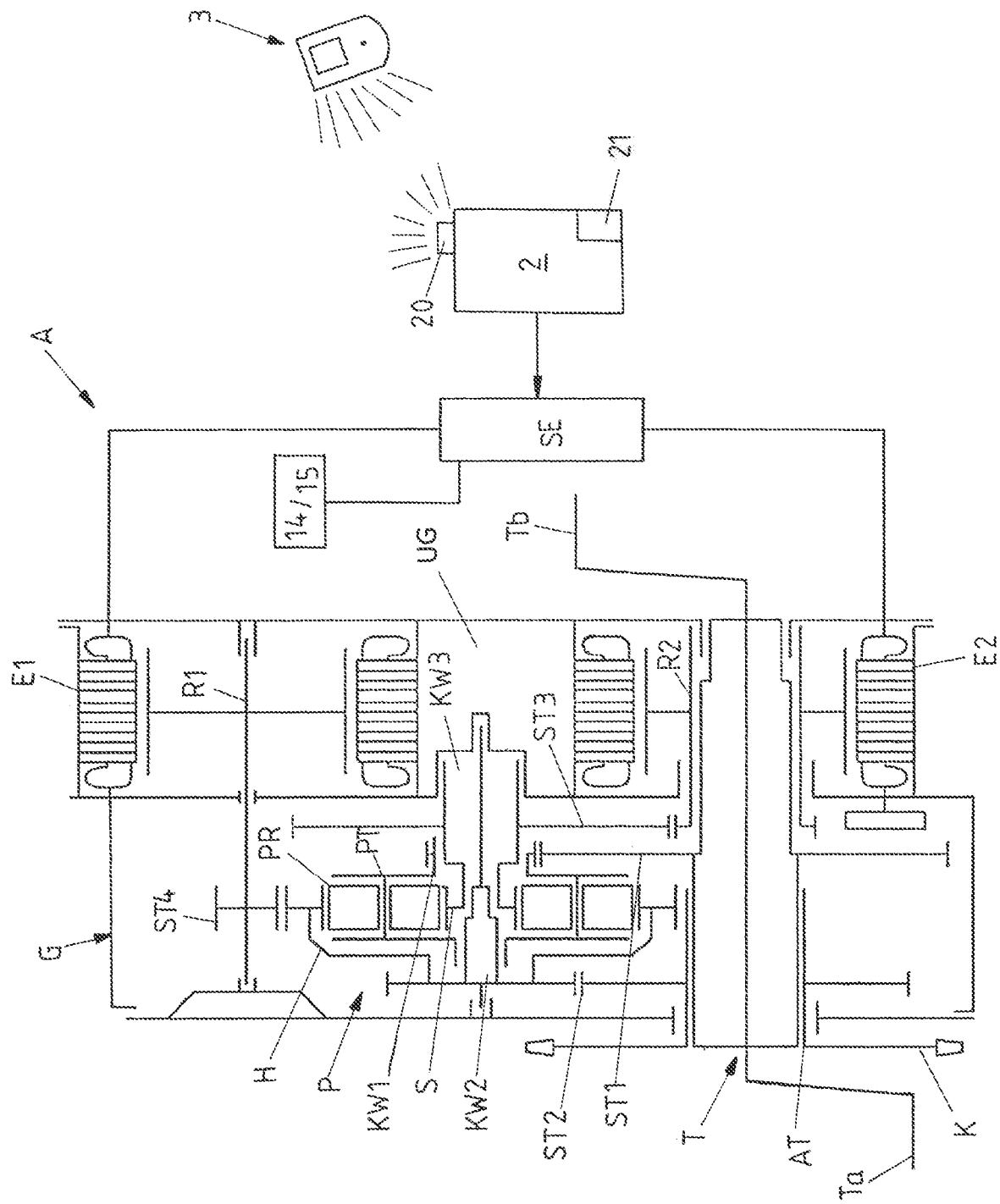
FIG. 1 shows a design variant of a driving device by illustrating a superposition transmission which couples a bottom pedal shaft with an output shaft and whose gear ratio is steplessly adjustable via two electric motors, in combination with an electronic anti-theft device.

FIG. 1 shows a design variant of a proposed driving device A. In a housing G, which is to be mounted to a frame of an electric bicycle, the components of a superposition transmission UG and two electric motors E1 and E2 are accommodated. The electric motors E1 and E2 can be of identical construction, i.e. for example with equal power and equal dimensions. The driving device A furthermore comprises a pedal shaft T to be connected with pedals, on which pedal holders Ta and Tb are provided. By rotating the pedal shaft T about is longitudinal axis, a rider of an electric bicycle, which is equipped with the driving device A, can introduce a driving torque. The pedal shaft T passes through the housing G so that the pedal holders Ta and Tb protrude on both sides of the housing G.

Via the superposition transmission UG a rotation of the pedal shaft T is translated into a rotation of an output shaft AT. The output shaft AT is non-rotatably connected (fixed) with a shaft-side first coupling part K. The shaft-side first coupling part K for example includes a sprocket or a pulley and via a power transmission member, for example a chain or a belt, is connected with a wheel-side second coupling part, for example in the form of a sprocket or a pulley, in order to drive a rear wheel of the electric bicycle.

A gear ratio of the superposition transmission UG is steplessly adjustable by means of the two electric motors E1 and E2. A first electric motor E1 can generate a torque which can at least partly be transmitted to the output shaft AT in order to drive the electric bicycle with electromotive support. With the two electric motors E1 and E2 a stepless electric actuator thus is formed.

The electric motors E1 and E2 each drive an associated rotor shaft R1 or R2. The pedal shaft T, the output shaft AT and the rotor shafts R1 and R2 are coupled with each other via the multistage superposition transmission UG. The superposition transmission UG therefor comprises a plurality of gear stages, here in the form of spur gear stages ST1 to ST4, and a planetary gear stage P (also known as a planetary gear set). The planetary gear stage P is configured with three shafts and beside a sun gear S comprises a planetary gear carrier PT with a plurality of planetary gears PR and a rotatable internal gear H (also known as a ring gear).

The pedal shaft T, the output shaft AT and the (second) rotor shaft R2 associated with the second electric motor E2 are arranged coaxially to each other. The (first) rotor shaft R1 of the first electric motor E1 extends parallel thereto. The pedal shaft T is connected with a first coupling shaft KW1 in a torque-transmitting manner via a first spur gear stage ST1 of the superposition transmission UG. This first coupling shaft KW1 is connected with the planetary gear carrier PT of the planetary gear stage P. Via a second spur gear stage ST2, the output shaft AT in turn is connected with a second coupling shaft KW2 which is non-rotatably connected with the internal gear H. While the speed of the pedal shaft T is increased to a larger absolute speed of the first coupling shaft KW1 via the first spur gear stage ST1, the speed of the second coupling shaft KW2 is translated into a lower speed of the output shaft AT by the second spur gear stage ST2.

The second, supporting electric motor E2 transmits a torque to a third coupling shaft KW3 supporting the sun gear S via its second rotor shaft R2 by means of a third spur gear stage ST3. Via the illustrated gear ratio of the third spur gear stage ST3, a step-down ratio is provided here. A torque generated on the part of the first electric motor E1 in turn is transmitted to the internal gear H via its first rotor shaft R1 by means of a fourth spur gear stage ST4. The first rotor shaft R1 of the first electric motor E1 correspondingly is connected with the output shaft AT (via the internal gear H) in a torque-transmitting manner. Hence, an output-side power split is provided in the illustrated driving device A.

In the illustrated configuration, a torque can be generated via the first electric motor E1 to accelerate the output shaft AT and hence to accelerate the electric bicycle. The second electric motor E2 is actuated by means of an electronic control unit SE of the driving device A in dependence on the speed of the first electric motor E1 and its rotor shaft R1, respectively. The gear ratio of the superposition transmission UG thereby is variably adjustable and an output torque provided on the output shaft AT and transmitted to the shaft-side coupling part K is variable electromotively without a rotational speed of the pedal shaft T having to be changed therefor. Depending on the speed of the first electric motor E1 the direction of rotation of the second rotor shaft R2 also can change in principle.

In the driving device A of FIG. 1 an electronic anti-theft device 2 is provided in addition, which is coupled with the electronic control unit SE for the actuation of the first and second electric motors E1 and E2. When the electronic anti-theft device 2 is activated, at least one of the electric motors E1 and E2 is operable in an operating condition in which an electromotively generated torque counteracts a rotation of the pedal shaft T. When the electronic anti-theft device 2 is activated, the drive can thus be braced against itself in that in response to a detected forward movement of the pedal shaft T the output side of the driving device A reacts with an opposite rotation and the electric motors E1, E2 therefor are actuated correspondingly. Via the driving device A the electric bicycle 1 then can no longer be ridden properly, until the anti-theft device 2 is deactivated again.

The fact that the pedal shaft T is rotated in a forward direction of rotation or that the electric bicycle 1 including the driving device A is moved, is electronically detected for example via a wheel sensor 14 or a motor sensor 15. A wheel sensor 14 associated with a front wheel or rear wheel of the electric bicycle 1, like also a motor sensor 15 detecting for example the rotation of the pedal shaft T, is connected with the electronic control unit SE so that signals generated on the part of the respective sensor 14, 15 can be transmitted to the electronic control unit SE.

An activation of the anti-theft device 2 for example is effected via an operating part 21 of the anti-theft device 2. Such an operating part 21 for example can be provided on a handlebar of an electric bicycle 1 or on the housing G and can be actuatable in order to lock the driving device A and hence the electric bicycle 1.

For unlocking the anti-theft device 2, the anti-theft device 2 can be equipped and configured to electronically authenticate an authorized user. Hence, the anti-theft device 2 only can be deactivated again in response to a successful authentication of an authorized user. An authentication here for example can be effected by entering a password on the operating part 21. Alternatively or in addition, an authentication can be effected on the basis of geometrical characteristics of an authorized user.

In principle, one of the authentications explained above (or also a different electronic authentication) can be effected on a mobile device 3 which can be wirelessly coupled with the electronic anti-theft device 2. The electronic anti-theft device 2 therefor then for example comprises a signal receiver 20 in order to receive a deactivation signal from the mobile device 3, in case a successful authentication of an authorized user has been effected on the mobile device 3. When a user has authenticated himself via the mobile device 3, the deactivation signal is sent to the electronic anti-theft device 2 and the same is deactivated so that the drive of the electric bicycle 1 again is fully usable.

On the mobile device 3 a software application can be installed, for example, which—by corresponding parameterization and/or encryption—is associated with the anti-theft device 2 and upon initialization queries authentication parameters which are to be entered and to be fulfilled on the part of an authorized user before the activated anti-theft device 2 can be deactivated again. On initialization, for example a password may have to be entered or a query for biometrical data may be effected in order to for example read in at least one fingerprint on a fingerprint reader of the mobile device and/or to carry out a facial recognition via a camera of the mobile device.

Alternatively or in addition, the anti-theft device 2 can also comprise a transmitter for data transmission. The anti-theft device 2 for example can signal to a mobile device 3 that a deactivation of the anti-theft device 2 has been effected. Furthermore, location information can be transmitted to the mobile device 3 in order to inform about the current location of the driving device A and hence of the electric bicycle equipped therewith.

Figure 2:
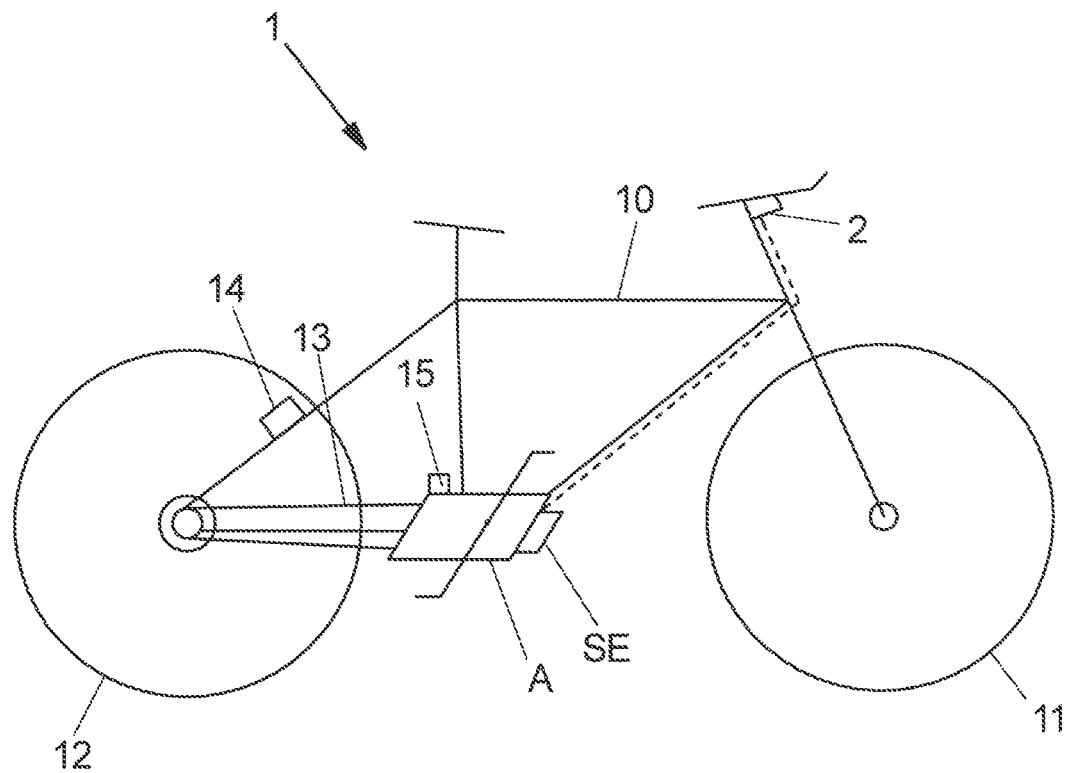
FIG. 2 schematically shows an electric bicycle with a driving device of FIG. 1.

FIG. 2 illustrates an electric bicycle 1 with the driving device A of FIG. 1. The electric bicycle 1 includes a frame 10 to which the driving device A with its electronic control unit SE and the motor sensor 15 is attached. Via a belt or a chain 13 the driving device A is connected with a rear wheel 12 of the electric bicycle 1 in order to be able to drive the electric bicycle 1. Here, by way of example the wheel sensor 14 also is associated with this rear wheel 12. Of course, however, the wheel sensor 14 or an additional wheel sensor 14 might also be provided on a front wheel 11 of the electric bicycle 1.

The electronic anti-theft device 2 in the present case is provided in the region of a handlebar of the electric bicycle 2 and coupled with the electronic control unit SE via a signal line. Alternatively, however, for example merely the operating part 21 of the anti-theft device 2 can be provided in the region of the handlebar or the anti-theft device 2 is completely arranged on or in the housing G of the driving device A.

Figure 3:
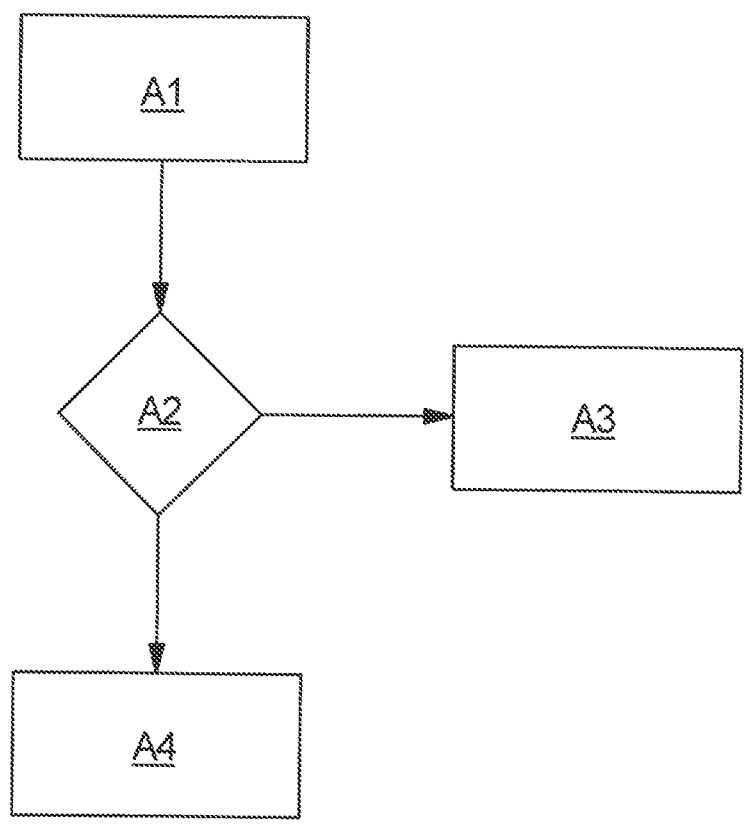
FIG. 3 shows a flow diagram for a design variant of a proposed control method with activated anti-theft device.

A flow diagram of FIG. 3 illustrates a possible design variant of a proposed control method in order to decide, when the electronic anti-theft device 2 is activated, via the signalization to the electronic control unit SE in how far the drive of the electric bicycle is to be switched to be unusable.

In a first method step A1 the anti-theft device 2 initially is activated and the electric motors E1 and E2 are on stand-by. When a movement of the electric bicycle 1 now is detected in a method step A2 and it is noted that the pedal shaft T is rotated in a forward direction of rotation, an actuation of the electric motors E1 and E2 is effected via the anti-theft device 2 and the electronic control unit SE such that a torque is generated electromotively, which counteracts the rotation of the pedal shaft T.

Before the generation of the counteracting torque it can for example be effected that first a defined period is awaited to check whether an authentication of an authorized user still is effected, and/or it is checked whether the rotation of the pedal shaft T is effected at a rotational speed exceeding a threshold value. The generation of the counteracting torque via the electronic anti-theft device 2 thus is effected for example only after at least one further criterion is fulfilled.

For example, when an authorized user is successfully authenticated within a predefined time window after the detection of a rotation of the pedal shaft T, a deactivation of the electronic anti-theft device 2 is effected in a method step A3. Otherwise, the counteracting torque is electromotively generated in a method step A4 and the anti-theft device 2 remains activated.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE NUMERALS

1 electric bicycle
10 frame
11 front wheel
12 rear wheel
13 chain/belt (power transmission member)
14 wheel sensor
15 motor sensor
2 anti-theft device 20 signal receiver
21 operating part
3 mobile device
A driving device
AT output shaft
E1 1st electric motor
E2 2nd electric motor
G housing
H internal gear
K coupling part
KW1-KW3 coupling shaft
P planetary gear stage
PR planetary gear
PT planetary gear carrier
R1, R2 rotor shaft
S sun gear
SE electronic control unit
ST1-ST4 spur gear stage
T pedal shaft
Ta, Tb pedal holder
UG superposition transmission

The invention claimed is:

1. A driving device for an electric bicycle comprising:
a pedal shaft;
an output shaft for driving a wheel of the electric bicycle; and
a superposition transmission including a gear ratio that is steplessly adjustable by electric motors and via which the pedal shaft and the output shaft are coupled with each other,
wherein a torque generated by a first electric motor of the two electric motors is at least partly transmitted to the output shaft; and
an electronic anti-theft device via which at least one of the electric motors is operable in an operating condition in which an electromotively generated torque counteracts a rotation of the bottom bracket pedal shaft (T) in a forward direction of rotation.

2. The driving device of claim 1, further comprising an electronic control unit configured to actuate at least one of the electric motors for generating the counteracting torque, when the anti-theft device is activated, in response to an electronically detected rotation of the pedal shaft in the forward direction of rotation.

3. The driving device of claim 2, wherein the electronic control unit is configured to actuate the at least one electric motor for generating the counteracting torque, when the anti-theft device is activated, only after it has been electronically detected that a rotational speed of the pedal shaft has exceeded a threshold value, the pedal shaft has been rotated by at least a stored minimum number of revolutions, or a defined monitoring period has elapsed.

4. The driving device claim 1, wherein, the anti-theft device is configured to electronically authenticate an authorized user and deactivate in response to the authentication of an authorized user.

5. The driving device of claim 4, wherein the anti-theft device includes an operating part provided on the electric bicycle and via which a user can authenticate himself to the anti-theft device.

6. The driving device of claim 4, wherein the anti-theft device includes a mobile transmitting device on which an authorized user can self-authenticate.

7. The driving device of claim 4, further comprising an electronic control unit configured to actuate at least one of the electric motors for generating the counteracting torque, when the anti-theft device is activated, in response to an electronically detected rotation of the pedal shaft in the forward direction of rotation, wherein the electronic control unit is configured to actuate the at least one electric motor for generating the counteracting torque, when the anti-theft device is activated, only after an authorized user has not been authenticated within a specified period after the electronic detection of a movement of the electric bicycle.

8. The driving device of claim 3, wherein the electronic control unit is further configured to actuate the at least one electric motor for generating the counteracting torque, when the anti-theft device is activated, only after it has been electronically detected that on the one hand a rotational speed of the bottom bracket pedal shaft has exceeded a threshold value, the bottom bracket pedal shaft has been rotated by at least a stored minimum number of revolutions, or a defined monitoring period has elapsed, and an authorized user has not been authenticated within a specified period after an electronic detection of a movement of the electric bicycle.

9. The driving device of claim 4, wherein the anti-theft device is configured to wirelessly receive a deactivation signal from a remote mobile transmitting device.

10. A method for controlling a drive of an electric bicycle that includes a pedal shaft, an output shaft, first and second electric motors, and a superposition transmission including a gear ratio that is steplessly adjustable by the first and second electric motors, wherein the superposition transmission outputs a torque generated by the first and second electric motors to the output shaft the method comprising:
activating an anti-theft device; and
operating the first and second electric motors to generate torque that counteracts rotation of the pedal shaft in a forward direction of rotation in response to the activating the anti-theft device and the pedal shaft being rotated.

11. The method of claim 10 further comprising:
sensing a speed of the output shaft; and
in response to the speed of the output shaft exceeding a threshold, operating the first and second electric motors to generate torque that counteracts rotation of the pedal shaft in the forward direction of rotation.

12. The method of claim 10 further comprising:
starting a timer in response to the pedal shaft being rotated; and
in response to the timer exceeding a threshold, operating the first and second electric motors to generate torque that counteracts rotation of the pedal shaft in the forward direction of rotation.

13. An electric bicycle comprising:
a driven wheel;
a driving device including:
    a first electric motor,
    a second electric motor,
    a pedal shaft,
    an output shaft driveably connected to the driven wheel, and
    a superposition transmission having a gearing arrangement coupling the first electric motor, the second electric motor, and the pedal shaft to the output shaft,
wherein a gear ratio of the transmission is steplessly adjustable by the first and second electric motors;
an anti-theft device; and
a controller programmed to, in response to the anti-theft device being activated, command operation of at least one of the electric motors to counteract rotation of the pedal shaft to inhibit rotation of the driven wheel.

14. The electric bicycle of claim 13, wherein the command operation of at least one of the electric motors to counteract rotation of the pedal shaft is further in response to expiration of a timer.

15. The electric bicycle of claim 14, wherein the timer starts in response to the anti-theft device being activated and the pedal shaft rotating.

16. The electric bicycle of claim 13, wherein the command operation of at least one of the electric motors to counteract rotation of the pedal shaft is further in response to rotation of the pedal shaft.

17. The electric bicycle of claim 13, wherein the gearing arrangement constrains the output shaft and the first electric motor to rotate at proportional speeds.

18. The electric bicycle of claim 13, wherein the gearing arrangement includes a planetary gearset having a ring gear fixed to the first electric motor and the output shaft, a sun gear fixed to the second electric motor, and a planet carrier having planet gears meshing with the ring gear and the sun gear, wherein the planet carrier is fixed to the pedal shaft.

19. The electric bicycle of claim 13 further comprising a speed sensor configured to output a signal indicative of a measured speed of the driven wheel, wherein the controller is further programmed to receive the signal, and wherein the command operation of at least one of the electric motors to counteract rotation of the pedal shaft is further in response to the measured speed of the driven wheel exceeding a threshold.

20. The electric bicycle of claim 13, wherein the anti-theft device is mounted on the bicycle.

* * * * *